United States Patent [19]
Bower

[11] Patent Number: 6,165,322
[45] Date of Patent: Dec. 26, 2000

[54] POLYAMIDOAMINE/EPICHLOROHYDRIN RESINS BEARING POLYOL SIDECHAINS AS DRY STRENGTH AGENTS

[75] Inventor: Barton K. Bower, Nottingham, Pa.

[73] Assignee: Hercules Incorporated, Wilmington, Del.

[21] Appl. No.: 08/901,887

[22] Filed: Jul. 29, 1997

[51] Int. Cl.$^7$ ................ C08G 73/02; D21H 17/55; D21H 21/20
[52] U.S. Cl. ............... 162/164.3; 162/158; 162/164.6; 162/175; 525/54.2; 525/54.21; 525/54.24; 525/430; 525/435; 525/427
[58] Field of Search ............... 525/54.2, 54.21, 525/54.24, 427, 430, 435; 162/158, 164.3, 164.6, 175

[56] References Cited

U.S. PATENT DOCUMENTS

| | | | |
|---|---|---|---|
| 2,926,116 | 2/1960 | Keim | 162/164 |
| 3,314,897 | 4/1967 | Gaertner | 260/2 |
| 3,320,066 | 5/1967 | Garth | 96/85 |
| 3,763,060 | 10/1973 | Hamerstrand et al. | 260/9 |
| 3,962,159 | 6/1976 | Ray-Chaudhuri et al. | 260/17.4 |
| 4,097,427 | 6/1978 | Aiken et al. | 260/9 |
| 4,267,059 | 5/1981 | Behn et al. | 210/736 |
| 4,537,657 | 8/1985 | Keim | 162/164.3 |
| 4,605,709 | 8/1986 | Maslanka | 525/430 |
| 4,818,341 | 4/1989 | Degen et al. | 162/168.2 |
| 4,940,514 | 7/1990 | Stange et al. | 162/168.2 |
| 5,116,887 | 5/1992 | Fischer et al. | 523/400 |
| 5,120,773 | 6/1992 | Fischer et al. | 523/400 |
| 5,171,795 | 12/1992 | Miller et al. | 525/430 |
| 5,334,287 | 8/1994 | Hartmann et al. | 162/175 |
| 5,434,222 | 7/1995 | Reiners et al. | 525/432 |
| 5,500,150 | 3/1996 | Scheibel et al. | 252/544 |

FOREIGN PATENT DOCUMENTS

| | | |
|---|---|---|
| 797130 | 10/1968 | Canada . |
| 797141 | 10/1968 | Canada . |
| 0 000 714 | 7/1978 | European Pat. Off. . |
| 488767 | 3/1992 | European Pat. Off. . |
| 1488141 | 7/1967 | France . |
| 69/5018 | 7/1969 | South Africa . |
| 865727 | 4/1961 | United Kingdom . |
| 91/09174 | 6/1991 | WIPO . |
| 94/16007 | 7/1994 | WIPO . |

OTHER PUBLICATIONS

Ring–Opening Alkylations of 1,1–Dialkyl–3–Substituted Azetidinium Cations. Substituent Entropy–Controlled Strained Ring–Chain Equilibria, Gaertner, V. R., J. Org. Chem. vol. 33, No. 2, Feb. 1968, pp. 523–530.

Linear and star–shaped hybrid polymers, 2(a), Coupling of mono– and oligosaccharides to a,w–diamino substituted poly(oxyethylene) and multifunctional amines by amide linkage; Ziegast, G., B. Pfannemüller, Makromol. Chem., Rapid Commun. 5,373–379 (1984).

The Mechanism of Epoxide Reactions. Part I. The Reactions of 1:2–Epoxyethylbenzene, 1:2–Epoxy–3–phenoxypropane with Some Secondary Amines, Chapman et al, J. Chem. Soc. 1925–1934 (1959).

Emmerling et al., Carbohydrate Research, vol. 86, No. 2, pp. 321–324 (1980).

Kagan et al., Journal of the American Chemical Society, vol. 79, No. 13, pp. 3541–3544 (1957).

Yoshimura et al., Bulletin of the Chemical Society of Japan, vol. 45, No. 4, pp. 1227–1230 (1972).

Ziegast et al., Makromol. Chem., Rapid Commun. vol. 5, No. 7, pp. 373–379 (1984).

Schaffer et al., Methods in Carbohydrate Chemistry, vol. li—Reactions of Carbohydrates, Academic Press Inc., New York, pp. 11–12, 1963.

*Primary Examiner*—Ana Woodward
*Attorney, Agent, or Firm*—Greenblum & Bernstein, P.L.C.

[57] ABSTRACT

Compositions suitable for use as dry strength additives comprising water soluble polyamidoamine/epchlorohydrin resin bearing polyol sidechains wherein the weight fraction of the polyol in the resin is less than 50 percent by weight and the polyol sidechain is attached to the polyamidoamine/epichlorohydrin resin by carbon-nitrogen bond, such as amide bond or secondary or tertiary amine bonds.

21 Claims, No Drawings

POLYAMIDOAMINE/EPICHLOROHYDRIN RESINS BEARING POLYOL SIDECHAINS AS DRY STRENGTH AGENTS

BACKGROUND OF THE INVENTION

1. Field of the Invention

The present invention relates to dry strength additives for paper and more particularly it relates to polyamidoamine/epichlorohydrin resins bearing polyol sidechains.

2. Description of the Prior Art

Strength is a very important property of paper products. At constant basis weight, the use of dry strength additives increases strength. Dry strength agents enable the papermaker to use less pulp, less expensive pulp and/or more filler while making sufficiently strong, stiff and opaque paper products. Benefits to the users of paper products include stronger packaging and lower shipping or postage costs. Conventional dry strength agents include starch, urea/formaldehyde resins, melamine/formaldehyde resins, acrylamide copolymers and polyamidoamine/epichlorohydrin resins.

U.S. Pat. No. 3,962,159 (Ray-Chaudhuri, et al.) discloses copolymerization of water dispersible starches, polyamidoamines and epichlorohydrin. The weight ratio of starch to polyamidoamine is between 1:9 and 9:1. While Ray-Chaudhuri uses the term "graft copolymer" in fact he is making block copolymers of the polyamidoamines and starch using epichlorohydrin as a condensing agent. All U.S. Pat. No. 3,962,159 preparations form carbon-oxygen bonds between the starch and the polyamidoamine except for the one in Example 19 where a quaternary ammonium bond is formed.

U.S. Pat. No. 3,314,897 (Gaertner) discloses treating polysaccharide substrates (starch, textiles, such as cotton, linen, rayon, and cellulose paper products) with a minor amount of a prepolymer composed of aliphatic amine/epichlorohydrin adduct reacted with an amine having at least 2 amino hydrogens. In other words Gaertner uses a minor amount of his prepolymer to modify the polysaccharide substrates instead of modifying a polyamidoamine/epichlorohydrin resin by including polyol sidechains and obtaining a water soluble product.

U.S. Pat. No. 3,320,066 (Garth) discloses the separate addition of polyamide-epichlorohydrin resin, dialdehyde carbohydrate and optionally carboxymethyl cellulose and/or cationic starch to paper pulp, i.e., to the dilute slurry of paper pulp obtained after the beating operation.

South African Patent 695018 discloses starch/polymeric polyamine compositions wherein the polyamine is formed by a reaction of an alkylene dihalide, e.g. ethylene dichloride, and an amine, e.g., diethylenetriamine. There is no disclosure of making a polyaminoamide or a polyaminoamide/epichlorohydrin resin.

French Patent 1,488,141 (which corresponds to Canadian patent 797,130) discloses improving the strength of cellulosic material by (a) treating an aqueous suspension of cellulose fibers with a cationic wet strength resin (such as cationic urea-formaldehyde resin, and cationic polyamides, obtained from the reaction of polyalkylenepolyamine and dicarboxylic acid which are crosslinked with epichlorohydrin) (b) adjusting the pH of the suspension to 4.0–5.5, (c) treating the suspension with a dialdehyde polysaccharide, (d) adjusting the pH of the suspension to 4.0–5.5 and (e) forming a web from the treated cellulose fibers.

U.S. Pat. No. 4,097,427 (Aitken) discloses the interaction of polyalkylenepolyamine/epichlorohydrin resins with starch for improved wet strength. It does not disclose polyamidoamine/epichlorohydrin resins.

U.S. Pat. No. 3,763,060 (Hamerstrand et al.) discloses the interaction of sodium starch xanthate with polyamide polyamine-epichlorohydrin (PAE) resin wherein the bond between the starch xanthate and the PAE resin is a carbon-sulphur bond.

U.S. Pat. No. 4,940,514 (Stange, et al.) discloses the interaction of vinyl polymers with enzymatically digested starch. There is no disclosure of polyamidoamine/epichlorohydrin resins.

U.S. Pat. No. 4,818,341 (Degen, et al.) discloses the interaction of vinyl polymers with enzymatically digested starch. There is no disclosure of polyamidoamine/epichlorohydrin resins.

U.S. Pat. No. 5,334,287 (Hartmann, et al.) discloses the use of N-vinylcarboxamide free radical graft copolymers of mono-, oligo- or poly-saccharides. It does not disclose polyamidoamine/epichlorohydrin resins.

SUMMARY OF THE INVENTION

According to the present invention there are provided compositions for improving the dry strength of paper comprising water-soluble, azetidinium ion-containing polyamidoamine/epichlorohydrin resins bearing polyol sidechains wherein the weight fraction of the polyol in the resin is less than 50% by weight and the polyol sidechain is attached to the polyamidoamine/epichlorohydrin resin by a carbon-nitrogen bond.

According to the present invention there are provided processes for the preparation of the water-soluble polyamidoamine/epichlorohydrin resins bearing polyol sidechains.

According to the present invention there is provided paper having improved dry strength characteristics containing water soluble polyamidoamine/epichlorohydrin resins bearing polyol sidechains.

According to the present invention there is further provided the process to enhance the dry strength of paper by adding to the aqueous pulp the water-soluble polyamidoamine/epichlorohydrin resins bearing polyol sidechains.

DETAILED DESCRIPTION OF THE INVENTION

It has been discovered that water-soluble, azetidinium ion-containing polyamidoamine/epichlorohydrin resins bearing polyol sidechains, wherein the weight fraction of the polyol in the resin is less than 50% by weight and the polyol sidechain is attached to the polyamidoamine/epichlorohydrin resin by amide, secondary amine or tertiary amine carbon-nitrogen bonds, will improve the dry strength of paper and as such will have an economic benefit for both the papermaker and the paper user.

The polyamidoamines are prepared by the method described in U.S. Pat. No. 2,926,116 and EPA 488,767. Polyamidoamine/epichlorohydrin resins having aminochlorohydrin, azetidinium and/or epoxide functionality may be prepared as described in U.S. Pat. No. 2,926,116; U.S. Pat. No. 5,171,795; EPA 488,767; GB 865,727; U.S. Pat. No. 4,605,709; and U.S. Pat. No. 4,537,657. The disclosure of these patents is incorporated herein by reference.

Polyol sidechains are defined as organic residues containing two or more hydroxyl groups, wherein at least half of the carbon atoms in the polyol sidechain bear hydroxyl groups. In order to be useful as starting materials for the compositions of the present invention, the precursor molecule of a polyol sidechain must also have one, and only one, functional group selected from the group consisting of carboxylic acid, lactone, amine and aldehyde. Carbohydrates, including monosaccharides, disaccharides, oligosaccharides and polysaccharides, glycerol, glyceraldehyde, 3-amino-1, 2-propanediol, 3-alkylamino-1,2-propanediol,3-hydroxyethylamino-1,2-propanediol, threose, erythrose, xylose, arabinose, ribose, fructose, glucose, galactose, mannose, sucrose, maltbiose, maltotriose, lactose, cellobiose, hemicellulose, cellulose, starch, dextrin, pyrodextrin, alginate, glycogen, inulin, furcellaran, agar, carrageenan, microbial gum, locust bean gum, fucoidan, guar, laminaran, gum arabic, ghatti gum, karaya gum, tragacanth gum, okra gum, tamarind gum, xanthan, scleroglucan, psyllium gum, pectin, dextran, methylcellulose, ethylcellulose, hydroxyethylcellulose, hydroxypropylcellulose and chitin are polyol sidechain precursors or they may be converted to polyol sidechain precursors. If not already present, a carboxylic acid, lactone, amine or aldehyde functional group can be provided to the structure of the starting material using conventional synthetic methods. For example, chitin may be depolymerized and deacetylated to form glucosamine, or alginate may be completely decarboxylated to give a terminal monoaldehyde.

Preferred polyol residues are threityl, erythrityl, xylityl, arabinityl, ribityl, fructityl, glucityl, galactityl, mannityl, maltobiotyl, maltotriotyl, lactobiotyl, cellobiotyl and pryrodextrinityl. For example, the term "glucityl polyol residue" refers to the 6-carbon polyol sidechain attached by means of the precursors 1-amino-1-deoxysorbitol, 1-methylamino-1-deoxysorbitol, glucosamine, gluconic acid, gluconolactone or N-aminoethyl gluconamide.

Most preferred polyol residues are glucityl, maltobiotyl, lactobiotyl and pryrodextrinityl.

The new compositions of the present invention can be made by reacting polyols having carboxylic acid or lactone functionality with polyamidoamines (PAA) to form amide bonds followed by reaction with epichlorohydrin. They can also be made by reaction of polyol amines with azetidinium or epoxide groups of the polyamidoamine/epichlorohydrin (PA/E) resins. Further, they can be made by reductive amination of reducing sugars with polyamidoamines followed by reaction with epichlorohydrin.

Accordingly, the compositions of the present invention can be prepared by (a) reacting a polyol having carboxylic acid or lactone functionality with less than about 95 mole percent of the amine groups of a polyamidoamine to form amide bonds. This is followed by (b) reacting the amine groups of the polyamidoamine that have not been utilized to form the amide bonds with epichlorohydrin to provide at least one of aminochlorohydrin, epoxide or azetidinium chloride functionality. The reaction of carboxylic acid and lactone functional groups with amines, as well as the reaction of amines with epichlorohydrin are well known procedures in the art [for example G. Ziegast, B. Pfannemuller, Makromol. Chem. Rap. Comm., 5, 373 (1984)] and can be carried out in conventional manner.

An alternate process for preparing the water-soluble, azetidinium ion-containing polyamidoamine/epichlorohydrin resins bearing polyol sidechains of the present invention is by reacting a polyol having amine functionality with less than about 95 mole percent of the azetidinium or epoxide functional groups of polyamidoamine/epichlorohydrin resin to form secondary or tertiary amine bonds. The reaction of amines with azetidinium or epoxide functional groups is well known in the art [for example N. B. Chapman et al, J. Chem. Soc., 1925 (1959) and V. R. Gaertner, J. Org. Chem., 33, 523 (1968)] and can be carried out by conventional procedures.

In another method for the preparation of the compositions of the present invention, polyol groups can be attached to polyamidoamine/epichlorohydrin resin by reductive amination of the aldehyde groups of reducing sugars by less than about 95 mole percent of the amine groups of the polyamidoamine to form tertiary amine bonds. Thereafter the amine groups of the polyamidoamine that have not been utilized to form the tertiary amine bonds are reacted with epichlorohydrin to provide at least one of aminochlorohydrin, epoxide or azetidinium chloride functionality. Reductive amination of aldehyde groups by amine groups to form amine bonds is well known in the art (for example J. J. Scheibel et al, U.S. Pat. No. 5,500,150, Mar. 19, 1996) and can be carried out by conventional procedures.

The new compositions of this invention retain the ability of polyamidoamine/epichlorohydrin polymers to be substantive to paper pulp, which is anionic, at neutral and basic papermaking pH's. Permanent cationic charge due to the azetidinium group is retained since at least 5 mole % of the azetidinium group that would be present in the absence of polyol sidechains is present in the new compositions. The polyol sidechains will also have an attraction for hemicelluloses on the pulp surfaces.

A fundamental problem of PA/E paper strength agents of prior art is that polyamidoamine/epichlorohydrin polymers do not mix optimally with amorphous cellulose since a given type of polymer solvates itself better than it would be solvated by a dissimilar type of polymer, and since polyamidoamine/epichlorohydrin polymers are quite different in structure from the amorphous cellulose polymers that naturally occur on the surface of paper pulp fibers. The new compositions of the present invention address this deficiency by providing polyamidoamine/epichlorohydrin polymers with polyol substituents that are highly compatible with amorphous cellulose and improve mixing of the strength additive and amorphous cellulose.

Polyol sidechains attached to polyamidoamine/epichlorohydrin polymers will be attracted to cellulose pulp surfaces and contribute to strength by forming hydrogen bonds with cellulose pulp surfaces. In order to facilitate the fiber-fiber bridging aspect of the mechanism of paper strengthening, the new compositions of this invention retain the self-crosslinking property of polyamidoamine/epichlorohydrin resins by possessing at least 5 mole % of the reactive functional groups (aminochlorohydrin, azetidinium and epoxide) that would be present in the absence of polyol sidechains. The polyol sidechain resins can increase in viscosity and molecular weight during paper drying and storage due to azetidinium and epoxide crosslinking reactions. The azetidinium and epoxide groups also form bonds to paper pulp by reacting with nucleophiles of the amorphous cellulose on the surface of paper pulp.

The following Examples are given for the purpose of illustrating the present invention. All parts and percentages are by weight unless otherwise specified.

EXAMPLE 1

Preparation of Polyamidoamine Lactobionic Amide

Lactobionic acid (26.86 g, 75 mmoles) and a polyamidoamine (Polymer 567 wet strength resin available from Hercules Incorporated) made from adipic acid and diethylenetriamine (57.18 g, 300 mmoles amine) in ethylene glycol (84 g) were heated at 130° C. for 80 minutes. Amine titration indicated that 24% of starting amine had been converted to carbohydrate amide.

Conversion of Polyamidoamine Lactobionic Amide to Resin

Polyamidoamine lactobionic amide (50% solids in ethylene glycol, 132.36 g, 176 mmoles amine), water (88.16 g), and epichlorohydrin (21.29 g, 230 mmoles) were stirred at 25° C. for 18 hr and then stirred and heated at 65° C. for 60 minutes. Water (417.7 g) and concentrated sulfuric acid (4.52 g) were added and the reaction mixture was cooled to room temperature giving product having 13.1% solids, pH 2.89, 46 cP Brookfield viscosity, 4520 ppm 1,3-dichloro-2-propanol, 2320 ppm 3-chloropropanediol and 24 wt % polyol in the final product on a dry organic solids basis.

EXAMPLE 2

Reaction of Polyamidoamine/epichlorohydrin Resin with Glucosamine

Polyamidoamine/epichlorohydrin resin (Kymene® 557H, wet strength resin available from Hercules Incorporated 12.3% solids, 63 cP Brookfield viscosity, 8200 ppm 1,3-dichloro-2-propanol, 2200 ppm 3-chloropropanediol, 499.98 g, 200 mmoles azetidinium plus aminochlorohydrin) and glucosamine hydrochloride (19.07 g, 88 mmoles) were mixed and the pH was adjusted to 10 with sodium hydroxide (6 molar). After stirring and heating at 65° C. for 50 minutes with the pH kept at 10, the reaction mixture was cooled to room temperature and acidified with concentrated sulfuric acid (10.89 g) giving product having 17.3% solids, pH 2.95, and Brookfield viscosity of 39 cP. HPLC (High Performance Liquid Chromatography) indicated that 39% of the glucosamine charged had reacted. The weight fraction of polyol in the final product was 20% on a dry organic solids basis.

EXAMPLE 3

Reaction of Polyamidoamine/epichlorohydrin Resin with Pyrodextrin N-Aminoethyl Amide Polyamidoamine/epichlorohydrin resin (Kymene® 557LX wet strength available from Hercules Incorporated, 12.4% solids, 42 cP Brookfield viscosity, 780 ppm 1,3-dichloro-2-propanol, 190 ppm 3-chloropropanediol, 720.89 g, 260 mmoles azetidinium plus aminochlorohydrin) and pyrodextrin N-aminoethyl amide (ICN Biomedicals Inc. pyrodextrin or Sigma Chemical Company pyrodextrin, oxidized by bromine, dehydrated, reacted with ethylene diamine, 50% solids in ethylene glycol, 59.63 g, 32 mmoles amine) were stirred at 25° C. keeping the pH at 9 with sodium hydroxide (6 molar, 109 g) until the Gardner-Holdt viscosity was "D-E" in 5 hours. Concentrated sulfuric acid (9.5 g) was added giving product with 12.7% solids, pH 2.91, Brookfield viscosity of 78 cP, 350 ppm 1,3-dichloro-2-propanol, 220 ppm 3-chloropropanediol, and 24 wt % polyol in the final product on a dry organic solids basis.

EXAMPLE 4

Papermaking and Dry Strength Testing

In Table 1 dry strengths of papers made from the new dry strength agents are compared with dry strengths of paper made with no strength additive (blank). Papers 1–7 contain resins made by the procedure of Example 1, papers 8–15 resins made by the procedure of Example 2, and papers 16–28 resins made by the procedure of Example 3. The paper pulp was a 70:30 mixture of James River Burgess bleached hardwood kraft : Rayonier bleached softwood kraft. Water hardness was 50 ppm, alkalinity was 25 ppm, and pH was 7.6. After beating with a Jones 12-inch double disk refiner, pulp freeness was 430–435 CSF. Dry strength agents of the present invention were added to the wet end of the papermaking machine at the level of 1 wt % vs. dry paper pulp. The paper was dried to 4.0–4.8 wt. % moisture using a 45 lb/linear inch press and seven drying rolls at 150–190° F. The basis weight of the paper was 40 lbs/ream. Oven curing was carried out at 80° C. for 0.5 hr. Z-direction (perpendicular to the plane of the paper) tensile strength was used as the measure of dry strength effect. The Z-direction tensile strength was measured by holding the sheet against two platens with double-sided tape and moving the platens away from each other with a CS-163D Digital ZDT Tester until the paper separated.

TABLE 1

Increase in Dry Z-Dimension Tensile Strength vs. Blank

| Paper # | Polyol Precursor | PAA or PAA/E | Carbo-hydrate Wt % | Inc. ZDT vs. Blank |
|---|---|---|---|---|
| 1 | Gluconolactone | P567 | 26% | 19.8% |
| 2 | Lactobionic lactone | P567 | 43 | 25.0 |
| 3 | Lactobionic lactone | P567 | 41 | 40.0 |
| 4 | Gluconolactone | P567 | 13 | 27.4 |
| 5 | Maltobionic lactone | P567 | 22 | 33.0 |
| 6 | Maltobionic lactone | P567 | 38 | 36.0 |
| 7 | Lactobionic lactone | P567 | 24 | 39.5 |
| 8 | Glucosamine.HCl | K557H | 34 | 21.8 |
| 9 | Meglumine | K557H | 36 | 30.2 |
| 10 | Meglumine | K557H | 28 | 37.5 |
| 11 | Aminosorbitol | K557H | 20 | 28.8 |
| 12 | Glucosamine.HCl | K557H | 34 | 29.9 |
| 13 | Glucosamine.HCl | K557H | 34 | 32.0 |
| 14 | Aminosorbitol | K557H | 20 | 35.5 |
| 15 | Glucosamine.HCl | K557H | 20 | 34.3 |
| 16 | N-Aminoethyl ICN II | K557LX | 38 | 50.4 |
| 17 | N-Aminoethyl ICN I | K557LX | 39 | 50.4 |
| 18 | N-Aminoethyl Sigma III | K557LX | 37 | 53.1 |
| 19 | N-Aminoethyl Sigma III | K557LX | 25 | 58.1 |
| 20 | N-Aminoethyl Sigma I | KSS7LX | 25 | 57.8 |
| 21 | N-Aminoethyl maltobionic | KS57LX | 17 | 47.5 |
| 22 | N-Aminoethyl lactobionic | KS57LX | 27 | 43.5 |
| 23 | N-Aminoethyl Sigma I | KS57LX | 39 | 57.6 |
| 24 | N-Aminoethyl lactobionic | KS57LX | 15 | 44.1 |
| 25 | N-Aminoethyl ICN I | KS57LX | 24 | 60.2 |
| 26 | N-Aminoethyl lactobionic | KS57LX | 15 | 47.5 |
| 27 | N-Aminoethyl ICN II | KS57LX | 24 | 54.7 |
| 28 | N-Aminoethyl maltobionic | KS57LX | 25 | 48.2 |

What is claimed is:

1. A composition comprising water soluble, azetidinum ion-containing polyamidoamine/epichlorohydrin resin bearing polyol sidechains wherein the weight fraction of the polyol in the resin is less than 50 percent by weight and the polyol sidechain is attached to the polyamidoamine/epichlorohydrin resin by carbon-nitrogen bond.

2. The composition of claim 1 wherein the polyol sidechain is attached to the polyamidoamine/epichlorohydrin resin by amide bond.

3. The composition of claim 1 wherein the polyol sidechain is attached to the polyamidoamine/epichlorohydrin resin by secondary or tertiary amine bond.

4. The composition of claim 1 wherein the polyol sidechain is selected from the group consisting of the polyol residues in monosaccharides, disaccharides, oligosaccharides and polysaccharides.

5. The composition of claim 1 wherein the polyol sidechain is selected from the group consisting of the polyol residues in monosaccharides, disaccharides, oligosaccharides and polysaccharides, glycerol, glyceraldehyde, 3-amino-1,2-propanediol, 3-alkylamino-1,2-propanediol,3-hydroxyethylamino-1,2-propanediol, threose, erythrose, xylose, arabinose, ribose, fructose, glucose, galactose, mannose, sucrose, maltbiose,maltotriose, lactose, cellobiose, hemicellulose, cellulose, starch, dextrin, pyrodextrin, alginate, glycogen, inulin, furcellaran, agar, carrageenan, microbial gum, locust bean gum, fucoidan, guar, laminaran, gum arabic, ghatti gum, karaya gum, tragacanth gum, okra gum, tamarind gum, xanthan, scleroglucan, psyllium gum, pectin, dextran, methylcellulose, ethylcellulose, hydroxyethylcellulose, hydroxypropylcellulose and chitin.

6. The composition of claim 5 wherein the polyol sidechain is selected from the group consisting of threityl, erythrityl, xylityl, arabinityl, ribityl,fructityl, glucityl, galactityl, mannityl, maltobiotyl, maltotriotyl,lactobiotyl, cellobiotyl and pryrodextrinityl.

7. The composition of claim 6 wherein the polyol sidechain is selected from the group consisting of glucityl, maltobiotyl, lactobiotyl and pryrodextrinityl.

8. A process for making paper to enhance the dry strength of the paper produced comprising adding to the aqueous pulp finish at the wet end of the papermaking machine the composition of claim 7 and forming paper from the aqueous furnish.

9. A process for making paper to enhance the dry strength of the paper produced comprising adding to the aqueous pulp finish at the wet end of the papermaking machine the composition of claim 6 and forming paper from the aqueous furnish.

10. The composition of claim 5 wherein the polyol sidechain is derived from polyol starting material having, either in the natural product or provided by synthetic method, a functional group selected from the group consisting of carboxylic acid, lactone, amine and aldehyde groups.

11. The composition of claim 10 wherein the polyol sidechain is derived from the group consisting of gluconolactone, lactobionic acid, lactobionic lactone, maltobionic acid, maltobionic lactone, glucosamine, 1-amino-1-deoxysorbitol, or 1-N-methylamino-1-deoxysorbitol (meglumine), glucose, maltose, and pyrodextrin N-aminoethyl amide.

12. The composition of claim 5, 11 or 7 wherein the weight fraction of the polyol in the resin is less than about 40 percent by weight.

13. The composition of claim 5, 11, or 7 wherein the weight fraction of the polyol in the resin is less than about 30 percent by weight.

14. The composition of claim 5, 11 or 7 wherein the weight fraction of the polyol in the resin is at least about 5 percent by weight.

15. The composition of claim 5, 11 or 7 wherein the weight fraction of the polyol in the resin is at least about 10 percent by weight.

16. A process for making paper to enhance the dry strength of the paper produced comprising adding to the aqueous pulp finish at the wet end of the papermaking machine the composition of claim 5 and forming paper from the aqueous furnish.

17. A process for making paper to enhance the dry strength of the paper produced comprising adding to the aqueous pulp finish at the wet end of the papermaking machine the composition of claim 1 and forming paper from the aqueous furnish.

18. The process of claims 17, 16, 9 or 8 wherein the amount of water soluble polyamidoamine/epichlorohydrin resin bearing polyol sidechains is from about 0.1 to about 10 percent based on the weight of dry pulp.

19. A process for preparing water soluble polyamidoamine/epichlorohydrin resin bearing polyol sidechains comprising:
(a) reacting polyol having carboxylic acid or lactone functional group with less than about 95 mole percent of the amine groups of polyamidoamine by formation of amide bonds;
and
(b) reacting amine groups of the polyamidoamine that have not been utilized to form the amide bonds with epichlorohydrin to provide at least one of aminochlorohydrin, epoxide or azetidinium chloride functionalities.

20. A process for preparing water soluble polyamidoamine/epichlorohydrin resin bearing polyol sidechains comprising: reacting polyol having amine functional group with less than about 95 mole percent of the azetidinium or epoxide functional groups of polyamidoamine/epichlorohydrin resin.

21. A process for preparing water soluble polyamidoamine/epichlorohydrin resin bearing polyol sidechains comprising:
(a) reductive amination of aldehyde groups of reducing sugars with polyamidoamine by less than about 95 mole percent of the amine groups of polyamidoamine to form tertiary amine bonds; and
(b) reacting amine groups of the polyamidoamine that have not been utilized to form the tertiary amine bonds with epichlorohydrin to provide at least one of arninochlorohydrin, epoxide or azetdinium chloride functionalities.

* * * * *